A. E. ROCHFORT.
INSECT KILLER.
APPLICATION FILED JULY 25, 1916.
1,228,701.
Patented June 5, 1917.
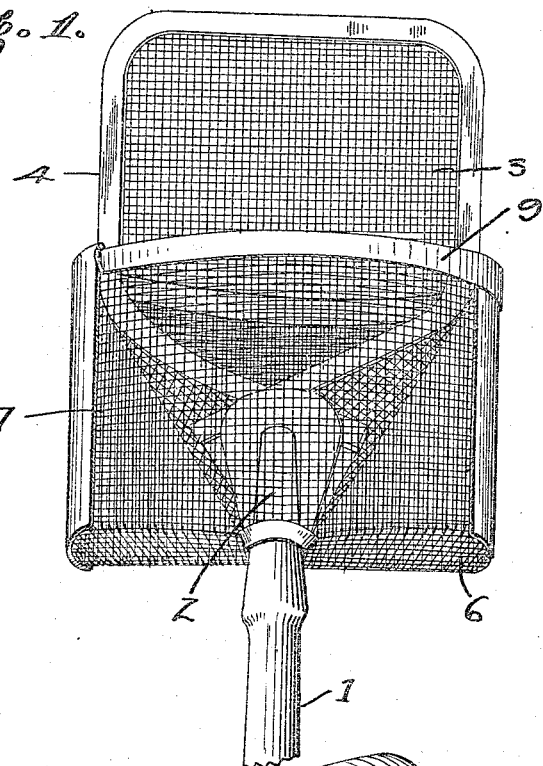
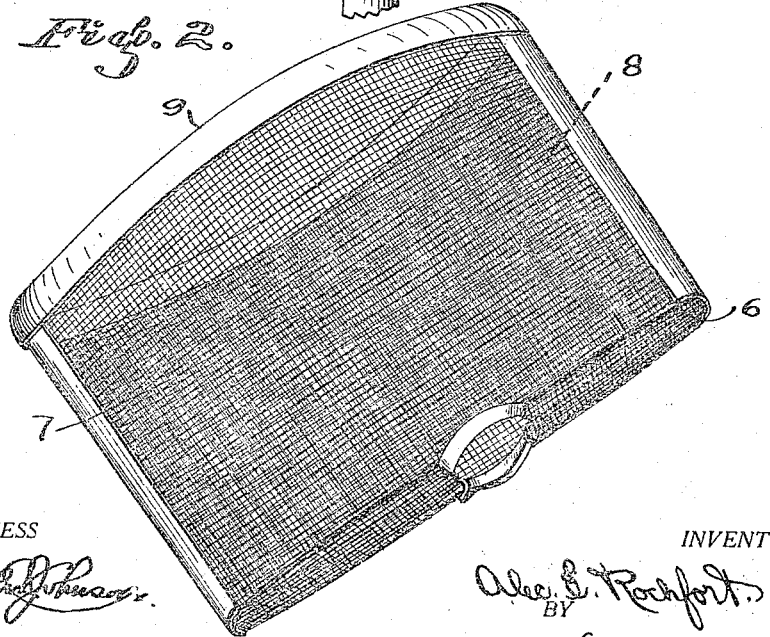
WITNESS
INVENTOR.
ATTORNEY.

UNITED STATES PATENT OFFICE.

ALEXANDER E. ROCHFORT, OF OAKLAND, CALIFORNIA.

INSECT-KILLER.

1,228,701.　　　　Specification of Letters Patent.　　Patented June 5, 1917.

Application filed July 25, 1916.　Serial No. 111,151.

*To all whom it may concern:*

Be it known that I, ALEXANDER E. ROCHFORT, a citizen of the United States, and a resident of the city of Oakland, county of Alameda, State of California, have made a new and useful invention in Insect-Killers; and I do hereby declare the following to be a full, clear, concise, and exact description of the same.

This invention relates more particularly to insect killers known in the trade as "fly swatters" and has for its object to provide means for retaining the bodies of the killed insects at the time that they are despatched.

In this specification and the annexed drawings, I illustrate the invention in the form that I consider the best, but it is to be understood that I do not limit myself to such form because said invention may be embodied in other forms, and it is also to be understood that in and by the claims following the description, I desire to cover the invention in whatever form it may be embodied. In the accompanying one sheet of drawing—

Figure 1 is a perspective from the front of an insect killer having a container combined therewith in accordance with this invention.

Fig. 2 is a perspective view of the container separated from the killer.

In detail the construction illustrated in the drawings includes an insect killer of conventional design consisting of the handle 1 with the slotted head 2 with the killer screen 3 fixed in the slotted head 2. The killer 3 is generally composed of wire netting or the like provided with a suitable binding 4 of rubber, felt or any other suitable material. This form of killer is suitable for crushing the insect against the wire without mutilation of the body which might stain the wall. The wire mesh prevents the formation of a blast of air ahead of the killer liable to dislodge the insect before the blow lands. This form of killer however is subject to the disadvantage that the body of the insect is released when the killer is withdrawn and drops to the floor or lodges on the furniture, causing an undesirable litter that must be gathered up and removed.

The container is preferably composed of wire netting folded back upon itself as at 6 to form the bottom and two sides of the receptacle when the edges 7 and 8 are suitably joined and bound with tape or in any other suitable manner. It is desirable also to bind the upper edges 9 of the retainer with felt or some soft material to prevent injury to the wall or other article upon which the insect may be crushed. The bottom 6 is provided with the opening through which the handle 1 of the killer is forced, the container being held in position as illustrated in Fig. 1 just beneath the killing screen 3. The resiliency of the netting surrounding the opening is sufficient to cause it to hug snugly to the handle 1 to hold the container in place. The upper edges of the container are forced outward to leave a space between the edge of the container and the surface of the killer screen.

The device is operated substantially as follows:

With the container in place as in Fig. 1 the insect, such as a fly, is usually found on a vertical wall, the operator holding the device in a vertical position by the handle 1, with a short sharp stroke crushes the insect between the wall and the killer 3 with sufficient violence to kill the insect, without crushing the body sufficiently to leave a stain upon the wall. The upper edge of the retainer now stands compressed between the killer 3 and the wall. When the pressure is relaxed from the killer the natural resiliency of the edge of the container causes it to maintain contact with the wall after the pressure of the killer 3 has relaxed sufficiently to permit the body of the dead insect to drop into the container where it is retained until intentionally removed by shaking or by removing the container from the handle for the purpose.

The container can be made up to be attached to any of the well known forms of insect killers at present on the market or it may be combined as a fixed part of the killer. The use of the container obviates the necessity of handling the bodies of dead insects, a disagreeable and unsanitary operation at best.

Having thus described this invention what I claim and desire to secure by Letters Patent is—

1. The combination with a handle, a flexible insect killer fixed in said handle and alined with said handle; and a retaining means attached to said handle and spaced therefrom and surrounding part of said killer.

2. In combination with a handle an insect killer abutting one end and positioned in the same plane as the handle, a container open at its upper end and having three side walls connected to each other along their edges and provided with an orifice adapted to removably engage the handle of said killer.

In testimony whereof, I have hereunto set my hand at San Francisco, California, this 12th day of March 1917.

ALEXANDER E. ROCHFORT.

In presence of—
W. W. HEALEY,
LINCOLN JOHNSON.

Copies of this patent may be obtained for five cents each, by addressing the "Commissioner of Patents, Washington, D. C."